UNITED STATES PATENT OFFICE.

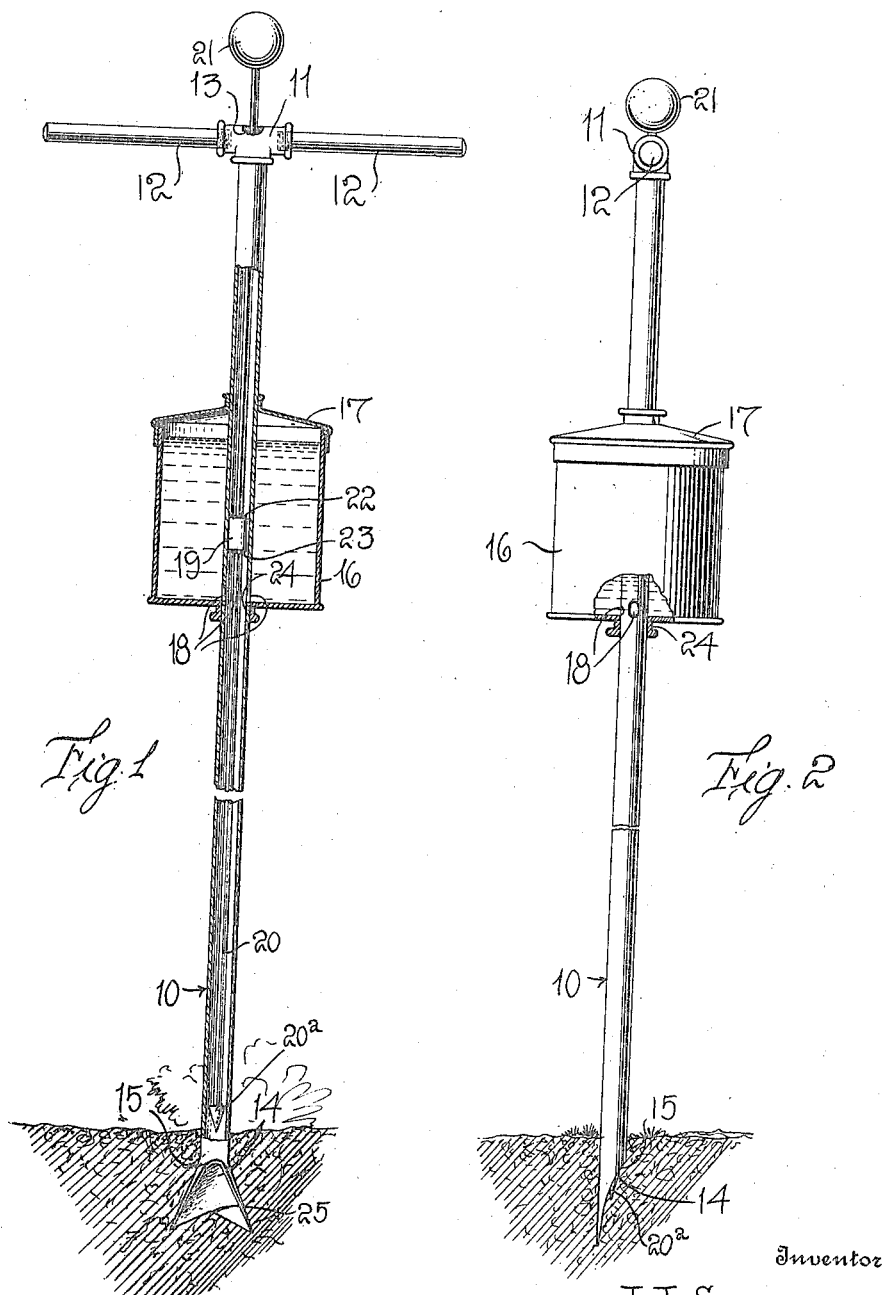

THEODORE T. SNOW, OF HOT SPRINGS, SOUTH DAKOTA.

WEED-DESTROYER.

1,257,544.　　　　　Specification of Letters Patent.　　Patented Feb. 26, 1918.

Application filed May 21, 1917. Serial No. 169,969.

*To all whom it may concern:*

Be it known that I, THEODORE T. SNOW, a citizen of the United States, residing at Hot Springs, in the county of Fall River and State of South Dakota, have invented certain new and useful Improvements in Weed-Destroyers, of which the following is a specification, reference being had to the accompanying drawings.

This invention relates to devices for destroying weeds and particularly to means for killing the roots of dandelions and other like weeds.

The general object of this invention is to provide an implement designed to be inserted in the ground whereby a liquid plant poison may be carried to the roots of the plant.

A further object of the invention is to provide a device of this character including a tubular penetrator, the lower end of which is flared and brought to a cutting edge so that the roots of the dandelion or other weed may also be cut.

A further object is to provide means whereby the tubular penetrator may be kept free of earth when being inserted and whereby any obstruction may be readily removed.

A further object is to provide a container mounted upon the tubular penetrator and having perforations whereby liquid in the container may pass into the tubular penetrator and provide a very simple form of valve for controlling the flow of liquid into the container and through the tubular penetrator to the roots of the plant.

A further object is to provide in this connection a combined valve and cleaning rod extending through the tubular penetrator and preventing its being clogged.

Another object is to provide a device of this character which is very readily handled and manipulated, which may be readily driven down into the ground and which is cheap to construct and will not readily get out of repair.

Further objects will appear in the course of the following description.

My invention is illustrated in the accompanying drawings, wherein:—

Figure 1 is a vertical sectional view of my improved weed destroyer, some of the parts being in elevation;

Fig. 2 is a side elevation of the destroyer, the container being partly in section.

Referring to these figures, 10 designates a penetrator which is tubular and preferably about three feet, two inches long and one-half inch in diameter. The upper end of the tubular penetrator is screw-threaded into a T 11 and the handle sections 12 are screw-threaded into the ends of this T. These handle sections are preferably each about four inches long. The upper end of the T is formed with a perforation 13 for the cleaning rod and valve rod as will be later stated. The lower end of the penetrator 10 is formed with an opening extending at an inclination to the axis of the penetrator and this opening is preferably about one and one-half inches long and the penetrator is widened to one and one-fourth inches wide. Preferably this pointed end of the penetrator is formed by a steel point swaged to the penetrator. The edge 15 of the opening 14 is sharpened.

About ten inches from the top of the tubular penetrator 10 there is disposed a container 16 which may be made of tin, or any other suitable metal, and is firmly fastened upon the tubular penetrator. This container is disposed at such a distance from the T 11 that the cover or top 17 of the container may be shifted up upon the upper end of the tubular penetrator so that the container may be filled. The penetrator 10 is formed with perforations 18 communicating with the lower portion of the container and passage through these perforations into the interior of the penetrator is governed by a valve 19 mounted upon a longitudinally extending rod 20. This rod has such a length that when it is in place and the valve is closed, the lower end of the rod will project out through the opening 14, as shown in Fig. 2. This rod is preferably a copper covered steel rod and extends sufficiently far above the T 11 as to provide for the attachment of a handle or knob 21 whereby the rod may be raised or lowered. The valve may be of any suitable material and may be either of rubber, leather or flax. The valve may be held in position by a copper washer 22 above the valve and a bushing 23 below the valve. Preferably the container holds about one-half gallon of liquid and the bottom of the container may be supported by means of a collar 24 fast to the penetrator 10. Preferably the cutting edge 15 at its middle is formed with a slight notch 25, which I find in practice assists the cutting action of the penetrator when it is desired to cut the roots of the plant. I also find that by spreading the cutting end of the penetrator laterally that the liquid is more evenly distributed adjacent the roots of the plant.

In the practical use of this invention the container is filled with liquid which is detrimental to the life of the plant and then the penetrator is inserted into the ground adjacent the roots of the plant. The lower end of the rod 20 prevents dirt from clogging up the lower end of the penetrator and when the penetrator has been forced inward a sufficient distance, the rod 20 is lifted thus opening the valve and permitting the liquid to pass down through the penetrator and be distributed around the roots of the plant. As soon as a sufficiency of liquid has been discharged, the rod 20 is closed thus cutting off the supply of liquid to the penetrator whereupon the device is ready for another operation. As I stated before, it is possible with this device to cut either single or branched roots, thus injuring the plant in two ways.

It will be seen that the liquid is controlled in the container close to the handle and is not normally carried within the tubular penetrator. If it were carried in the tubular penetrator, it would make the device difficult to handle. It will be further seen that my device is extremely simple and that it may be manufactured and sold for very little. It will further be seen that the valve is positively actuated and that it may be readily controlled. While I do not wish to be limited to any particular liquid for use with this weed destroyer, I have discovered that a liquid compounded as follows is of particular value. This liquid, while not a poison in the ordinary sense of the word, is particularly effective in killing weeds, when applied at the roots, and consists of kerosene, gasolene, tincture of capsicum and yellow ocher. This liquid may be compounded in the following proportions:—¾ gallon of kerosene, ¼ gallon of gasolene, 3 ounces of tincture of capsicum and 2 ounces of yellow ocher. The capsicum adds a pungent element to the kerosene and gasolene, while the yellow ocher is intended for the purpose of making the liquid plainer to be seen in the earth and further thickens the liquid which assists in preventing the too quick diffusion of the liquid through the soil and tends to retain it in the place in which it has been injected. The gasolene, when mixed with the kerosene, assists in causing the kerosene to penetrate quickly into the roots.

The extremity of the rod 20 may be provided with a conical head 20ª less in extreme diameter than the interior of the penetrator tube 10, as I have found that this head 20ª, when used, assists materially in preventing soft earth or mud from passing up into the interior of the penetrator tube. Preferably the penetrator 10 is slightly larger in diameter above the openings 18, so as to permit a freer movement of the valve in the upper portion of the penetrator.

Having described my invention, what I claim is:

1. A weed destroyer comprising a tubular penetrator, the lower end of the penetrator being formed with a downwardly and rearwardly inclined opening, the rear wall of said opening being laterally flared and formed with downwardly divergent cutting edges and the upper end being provided with a handle, a container mounted upon the penetrator adjacent the handle, there being openings between the container and the penetrator, a rod extending the full length of the penetrator, and a valve carried upon said rod fitting the bore of the penetrator and when shifted into one position extending across the openings and cutting off flow therefrom to thereby control the passage of liquid from the container to the penetrator, said rod when the valve is closed projecting beyond the upper end of the opening of the penetrator and preventing the latter from being plugged with earth.

2. A weed destroyer comprising a tubular penetrator having an opening at its lower end extending at an inclination to the axis of the penetrator and formed with a laterally enlarged cutting edge, the upper end of the penetrator having laterally extending handles, a container mounted upon the penetrator below the handles, a cover for the container through which the penetrator passes and which cover is slidable upward upon the penetrator, there being openings from the penetrator into said container, a rod extending through the entire length of the penetrator and formed with a handle at its upper end resting upon the upper end of the penetrator, said rod carrying a valve fitting the tubular penetrator and in one position cutting off the passage of liquid from the container into the penetrator, the rod being of such length that when the valve is closed, the rod will project beyond the opening of the penetrator to thereby prevent its being clogged with earth.

In testimony whereof I hereunto affix my signature in the presence of two witnesses.

THEODORE T. SNOW.

Witnesses:
T. G. ORR,
E. S. METCALF.